United States Patent
Konchitsky

(10) Patent No.: US 9,196,249 B1
(45) Date of Patent: *Nov. 24, 2015

(54) METHOD FOR IDENTIFYING SPEECH AND MUSIC COMPONENTS OF AN ANALYZED AUDIO SIGNAL

(71) Applicant: Alon Konchitsky, Santa Clara, CA (US)

(72) Inventor: Alon Konchitsky, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/698,548

(22) Filed: Apr. 28, 2015

Related U.S. Application Data

(63) Continuation-in-part of application No. 14/222,309, filed on Mar. 21, 2014, now Pat. No. 9,026,440, which is a continuation-in-part of application No. 14/068,228, filed on Oct. 31, 2013, now Pat. No. 8,712,771, which is a continuation-in-part of application No. 13/674,272, filed on Nov. 12, 2012, now Pat. No. 8,606,569, which is a continuation-in-part of application No. 12/813,350, filed on Jun. 10, 2010, now Pat. No. 8,340,964.

(60) Provisional application No. 61/222,827, filed on Jul. 2, 2009.

(51) Int. Cl.
| | |
|---|---|
| *G10L 21/00* | (2013.01) |
| *G10L 25/81* | (2013.01) |
| *G10L 15/22* | (2006.01) |
| *G10L 15/00* | (2013.01) |
| *G10L 13/00* | (2006.01) |
| *H04R 25/00* | (2006.01) |
| *H04B 15/00* | (2006.01) |
| *H04M 1/00* | (2006.01) |
| *H04M 1/64* | (2006.01) |
| *H04M 3/00* | (2006.01) |

(52) U.S. Cl.
CPC ............ *G10L 15/22* (2013.01); *G10L 25/81* (2013.01)

(58) Field of Classification Search
USPC .............. 704/205, 201, 233, 208, 226, 268; 379/88.01, 346, 376.02, 395.01; 455/63.1; 381/312
See application file for complete search history.

(56) References Cited

U.S. PATENT DOCUMENTS

| | | | |
|---|---|---|---|
| 2,761,897 | A | 9/1956 | Jones |
| 4,542,525 | A | 9/1985 | Hopf |
| 6,785,645 | B2 | 8/2004 | Khalil et al. |
| 6,950,511 | B2 | 9/2005 | Das et al. |

(Continued)

OTHER PUBLICATIONS

J. Saunders, "Real-time discrimination of broadcast speech/music," Proc. IEEE Int. Conf. on Acoustics.

(Continued)

*Primary Examiner* — Paras D Shah
*Assistant Examiner* — Neeraj Sharma
(74) *Attorney, Agent, or Firm* — Steven A. Nielsen; www.NielsenPatents.com

(57) ABSTRACT

Disclosed herein is a method for classifying one or more components of an audio signal received from a communication device. In one embodiment of the present invention, a Goertzel calculation is used to identify different frequency components of a selected sample. The identified frequency components of the selected sample may be analyzed based on one or more predefined factors. The predefined factors pertain to the typical music and speech component of a typical audio signal. The analysis of the frequency component of the selected sample gives resulting values that is compared to a bottom threshold for determining whether the identified component is a music component or a speech component.

4 Claims, 6 Drawing Sheets

(56) References Cited

U.S. PATENT DOCUMENTS

| | | | |
|---|---|---|---|
| 7,117,149 B1* | 10/2006 | Zakarauskas | 704/233 |
| 7,191,128 B2 | 3/2007 | Sall et al. | |
| 7,454,329 B2 | 11/2008 | Abe et al. | |
| 7,742,746 B2 | 6/2010 | Xiang et al. | |
| 2002/0165711 A1* | 11/2002 | Boland | 704/231 |
| 2003/0012358 A1* | 1/2003 | Kurtz et al. | 379/346 |
| 2003/0086541 A1* | 5/2003 | Brown et al. | 379/88.01 |
| 2004/0176949 A1* | 9/2004 | Wenndt et al. | 704/203 |
| 2005/0091066 A1 | 4/2005 | Singhal | |
| 2005/0192795 A1* | 9/2005 | Lam et al. | 704/201 |
| 2007/0027681 A1* | 2/2007 | Kim | 704/208 |
| 2007/0271224 A1* | 11/2007 | Essafi et al. | 707/3 |
| 2008/0249771 A1* | 10/2008 | Wahab | 704/233 |
| 2009/0012783 A1* | 1/2009 | Klein | 704/226 |
| 2009/0076814 A1* | 3/2009 | Lee | 704/233 |
| 2009/0125301 A1* | 5/2009 | Master et al. | 704/208 |
| 2009/0234645 A1* | 9/2009 | Bruhn | 704/205 |
| 2009/0265173 A1* | 10/2009 | Madhavan et al. | 704/268 |
| 2010/0027820 A1* | 2/2010 | Kates | 381/312 |
| 2011/0103573 A1* | 5/2011 | Susan | 379/395.01 |

OTHER PUBLICATIONS

Jani Penttila, Johannes Peltola, Tapio Seppanen, "A Speech/Music Discriminator-based Audio Browser With a Degree of Certainty Measure", VTT Electronics, Finland.

Khaled El-Maleh, Mark Klein, Grace Petrucci, Peter Kabal, "Speech/Music Discrimination for Multimedia Applications", McGill University, Canada.

* cited by examiner

METHOD FOR IDENTIFYING SPEECH AND MUSIC COMPONENTS OF AN ANALYZED AUDIO SIGNAL

CROSS REFERENCE TO RELATED APPLICATIONS

This application is a continuation in part ("CIP") patent application and claims the priority date(s) of US patent application Ser. No. 14/222,309 filed on Mar. 21, 2014 which is a CIP of Ser. No. 14/068,228 filed on or about Oct. 31, 2013, which in turn is a CIP of U.S. patent application Ser. No. 13/674,272 (now U.S. Pat. No. 8,606,569). The '272 application is a CIP of U.S. application Ser. No. 12/813,350 (now U.S. Pat. No. 8,340,964). The '350 application is a nonprovisional application and CIP based upon and claiming the priority date of U.S. provisional patent application 61/222,827 filed on or about Jul. 3, 2009. The present application claims the priority dates of the patent applications listed above and those listed in the concurrently filed Application Disclosure Statement or ADS.

FIELD OF THE INVENTION

The present invention relates to means and methods of identifying speech and music components in audio systems, devices, phones, and more specifically, to voice communication systems, devices, and methods that control when either speech or music is detected over telecommunication links.

This invention relates to the field of processing signals in voice gateways, Conference Bridge applications voice over ip, mobile phones, wireless headsets, Speech Recognition (ASR) systems, Music on Hold (MoH), and other applications. In general, the invention relates to devices or systems where music and or speech is/are transmitted or received.

BACKGROUND OF THE INVENTION

Voice communication devices such as Cell phones, Wireless phones, Bluetooth Headsets, Hands-free devices, ASR and MoH devices have become ubiquitous; they show up in almost every environment. These systems and devices and their associated communication methods are referred to by a variety of names, such as but not limited to, cellular telephones, cell phones, mobile phones, wireless telephones in the home and the office, and devices such as Personal Data Assistants (PDA$^s$) that include a wireless or cellular telephone communication capability. They are used at home, office, inside a car, a train, at the airport, beach, restaurants and bars, on the street, and almost any other venue. As might be expected, these diverse environments transmit different kinds of signals which include, but not limited to, speech only, speech with background noise, music only, speech with background music, as well as other combinations of sounds.

A primary objective is to provide means to efficiently retrieve information from global network of digital media which include mobile phones, internet, T.V, radio and other systems.

As the communication network grows, consumers will demand specific multimedia material stored in the digital media servers. Data mining tools may be used to browse the servers and download specific speech or music, hence the desire to classify speech and music.

Humans can easily discriminate speech and music by listening to a short segment of signal. A real-time speech/music discriminator proposed by Saunders [1] is used in radio receivers for the automatic monitoring of the audio content in FM radio channels. In conference bridge, Music on Hold applications, it is necessary to disable noise reduction during music durations. Another area of application is ASR. It is important to disable speech recognizer during non-speech and music durations. This can save power for mobile devices.

The speech/music classifiers have been studied extensively and many solutions have been proposed for cell phone, Bluetooth headsets, ASRs, MoH and Conference bridge applications.

Depending upon the particular application, the speech/music classification can be done offline or in real-time. For real-time applications, like Music on Hold, Conference Bridge applications, the method must have low latency and low memory requirements. For offline applications, the constraints on processing speed and memory requirements can be relaxed.

Current speech/music classifier solutions use data from multiple features of an audio signal as input to a classifier. Some data is extracted from individual frames while the other data is extracted from the variations of a particular feature over several frames. An efficient classifier can be achieved only if the speech and music can be detected reliably, consistently and with low error rates.

Several different kinds of speech/music classifiers are known in the related art which extract information based on the nearest-neighbor approach, including a K-d tree spatial partitioning technique.

U.S. Pat. No. 2,761,897 by Jones discloses a discriminator system where rapid drops in the level of an audio signal are measured. If the number of changes per unit frame crosses a particular threshold, the audio signal is labeled as speech. However, it uses a hardware approach to discriminate between speech and music.

U.S. Pat. No. 4,542,525 by Hopf discloses a logic circuit which uses the number of pauses and the time span of simultaneous or alternating appearance of signal pauses derived from the two different pulse sequences. The Hopf invention also employs a hardware solution.

Software solutions like US patent 2005/0091066 A1 by Singhal employ the usage of a zero point crossing counter for classifying speech and music. If the number of zero crossings exceeds a pre-determined threshold value, the incoming signal is considered music. However, this technique is not suitable for windy conditions which have high zero crossing rates.

It is an objective of the present invention to provide methods and devices that overcome disadvantages of prior schemes. Hence there is a need in the art for a method of speech/music discriminator that is robust, suitable for mobile use, and computationally inexpensive to integrate/manufacture with new/existing technologies.

SUMMARY OF THE INVENTION

The present invention provides a novel system and method for monitoring the audio signal, analyze selected audio signal components, compare the results of analysis with a pre-determined threshold value, and classify the audio signal either as speech or music.

In one aspect of the invention, the invention provides a system and method that enhances the convenience of using a communications device, in a location having speech only, music only or speech with background music.

In another aspect of the invention, the classification can be done either at the transmitting end or receiving end of a communication system.

In still another aspect of the invention, an enable/disable switch is provided on a communication device to enable/disable the speech/music discrimination.

In one embodiment of the present invention, a method for classifying one or more components of an audio signal received from a communication device is disclosed. Various samples of audio signals may be selected for which classification of the audio signal component is required. Thereafter, a Goertzel calculation may be used to identify different frequency components of the selected sample. Further, the frequency components of the selected sample may be analyzed based on the one or more predefined factors. The analysis of the frequency component of the selected sample gives resulting values that helps to determine whether the identified component is a music component or a speech component. According to the present invention, the predefined factors may include but does not limit to frequency measurements, frequency patterns, differences of adjacent frequency measurements, predefined frequency thresholds, deviation of frequencies, and other frequencies components of the typical audio signal.

In one embodiment of the present invention, a power measure of the selected sample is computed by inputting the selected sample into a high pass filter (HPF) and processing corresponding output signals of the HPF. Thereafter, average value of the power measure is calculated over a period of time to obtain a power level. A bottom threshold for the power level is defined and standard deviation of the selected sample is computed using the Geortzel calculations. When the computed value of the deviation is above the bottom threshold, then the frequency component is identified as music component. On the other hand, when the computed value of the deviation is below the bottom threshold, the frequency component is identified as the speech component.

These and other aspects of the present invention will become apparent upon reading the following detailed description in conjunction with the associated drawings. The present invention overcomes shortfalls in the related art by using unobvious means and methods to achieve unexpected results.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

The present invention provides a novel and unique speech/music discriminator feature for a communication device such as a cellular telephone, wireless telephone, cordless telephone, recording device, a handset, and other communications and/or recording devices. While the present invention has applicability to at least these types of communications devices, the principles of the present invention are particularly applicable to all types of communication devices, as well as other devices that process or record speech in speech/music environments. For simplicity, the following description employs the term "telephone" or "cellular telephone" as an umbrella term to describe the embodiments of the present invention, but those skilled in the art will appreciate the fact that the use of such "term" is not considered limiting to the scope of the invention, which is set forth by the claims appearing at the end of this description.

Hereinafter, preferred embodiments of the invention will be described in detail in reference to the accompanying drawings. It should be understood that like reference numbers are used to indicate like elements even in different drawings. Detailed descriptions of known functions and configurations that may unnecessarily obscure the aspect of the invention have been omitted.

Choosing the features that are capable of classifying the signals is an important step in designing the speech/music classification system. This feature selection is usually based on a priori knowledge of the nature of the signals to be classified. Temporal and spectral features of the input signal are often used. Previous work in this area includes zero-crossings information [1], energy, pitch, and spectral parameters such as cepstral coefficients [2] and [3].

The present invention uses the fact that in music the notes of a chromatic scale have predetermined frequencies and the appearance of these frequencies have specific patterns that allow to distinguish music from speech.

Figure 1:
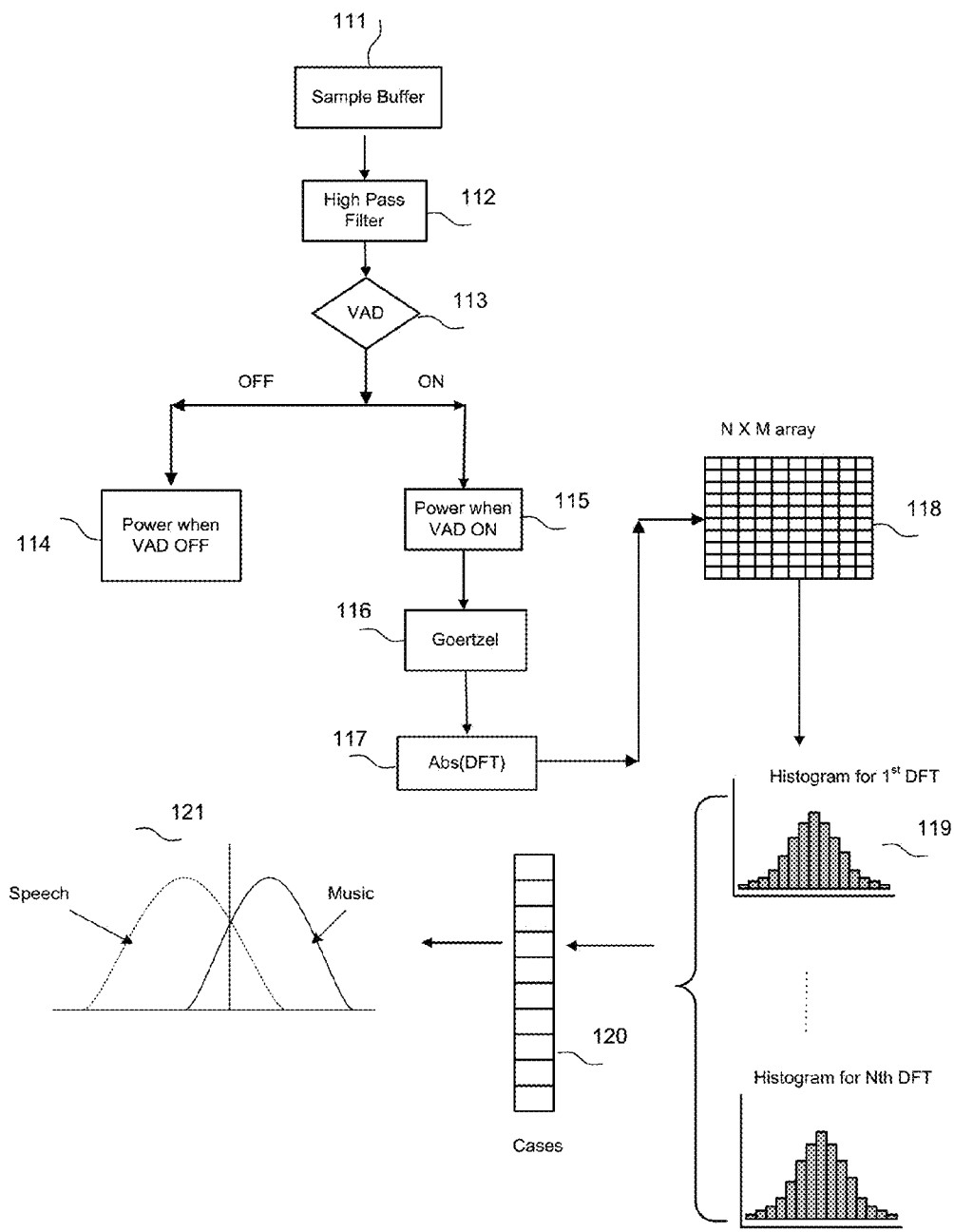
FIG. 1 is diagram of an exemplary embodiment of the block diagram of the speech/music discriminator discussed in the current invention.

In FIG. 1, block 111 is the input buffer of samples that are to be analyzed. A buffer size of N samples is chosen for analysis and a number of buffers (N_DEC) are processed to reach a decision. N is normally between 512 and 1024 samples and NDEC is between 50 and 100 buffers.

The input buffer is passed through a High Pass Filter (HPF) with a pre-determined cut-off frequency at block 112. The cut-off frequency is selected between 20 and 800 Hz. The output of the HPF is used to compute a power measure 113 using the equation:

$$pwr = \frac{1}{N}\sum_{k=0}^{N} x(k) * x(k)$$

Where N is the number of samples in the High Pass filtered buffer and k is the time index. This power is accumulated over a period of time consisting of N_DEC buffers. Once N_DEC buffers are accumulated then the power is transformed to a dB scale as $$level = 10\log_{10}\sum_{i=0}^{N_{DEC}} pwr(i)$$

The buffer with the HPF samples is processed by a Voice Activity Detector (VAD), 114, which makes a decision if the current buffer is speech or a pause, under the arbitrarily assumption that the input is speech. The power of the buffer when the VAD is OFF, pwr_sil, is calculated at 115. The power in dB is level_sil=10 log$_{10}$pwr_sil This value is exponentially averaged using the equation level$_{sil_{avg}}$=α*level$_{sil_{avg}}$+(1−α)*level_sil α is a value between 0.01 and 0.99. This level is used later to correct the final decision of the classifier.

The Goertzel block 116 identifies specific frequency components of a signal. Given an input sequence x(n), the Goertzel algorithm, computes a sequence, s(n) as s(n)=x(n)+2 cos(2πω)s(n−1)−s(n−2)

In contrast with the Fast Fourier Transform (FFT) which computes Discrete Fourier Transform (DFT) values at all indices, the Goertzel algorithm computes DFT values as specified subset indices (i.e., a portion of the signal's frequency range). The absolute value of the DFT is calculated as shown below at block 117.

adft=$\sqrt{s(n-1)^2+s(n-2)^2-2\cos(2\pi\omega)*s(n-1)*s(n-2)}$

The specific subset of frequencies where the Goertzel filters are located are the frequencies of the musical notes of the chromatic scale. Typically 3 or 4 octaves are enough to cover the telephony spectrum between 100 Hz and 4 KHz. Depending on the application bandwidth more octaves can be included. The DFTs (Goertzel's outputs) are stored in an array of N_DEC×M, 118. Where N_DEC represents the number of buffers considered per decision and M represents the number of pre-selected frequencies of the musical notes. Experimental results, showed that the numerical values of most of the DFTs are less than a particular threshold. However, for some signals, some of the DFTs were higher than the threshold. Such DFTs are saturated to a max level. The histograms 119 depicting the energy distribution for each pre-selected frequency (musical note) over a period of time N_DEC are calculated.

The histogram's bins of each note that are over a specified threshold are summed up and stored in a M element array. This array is called the Cases array, 120. This array represents the "level of activity" of each pre-selected frequency during the N_DEC period.

Figure 2:
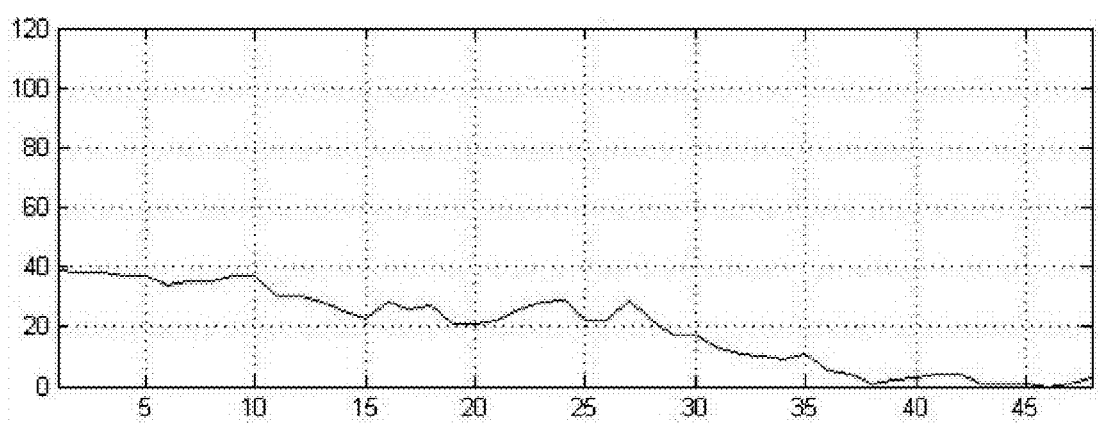
FIG. 2 is a plot of the "cases" array when the input signal is speech.
Figure 3:
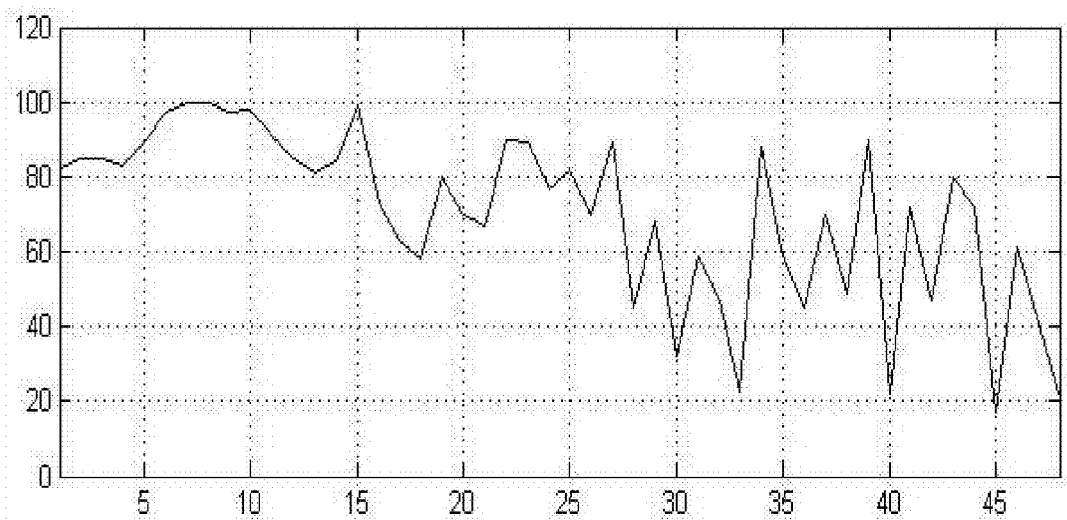
FIG. 3 is a plot of the "cases" array when the input signal is music
Figure 4:
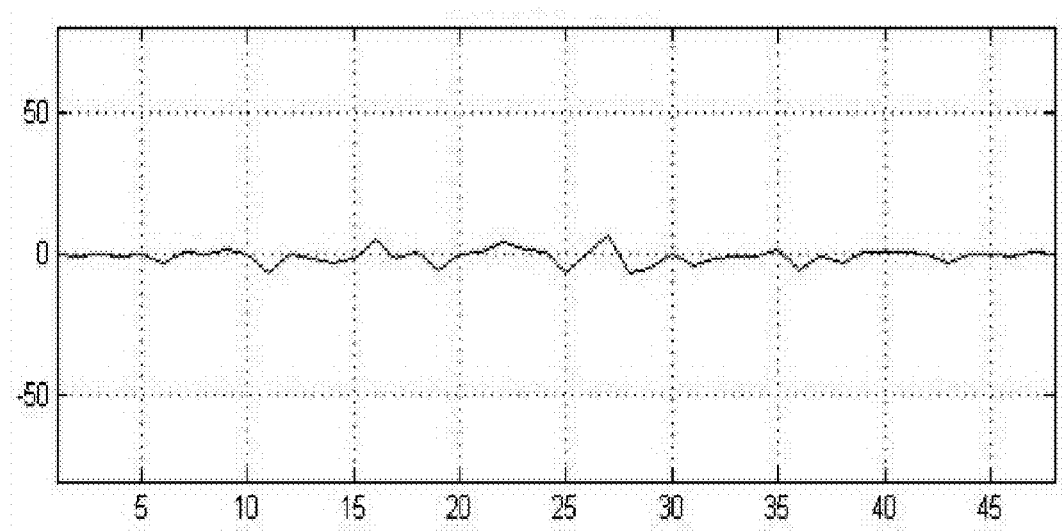
FIG. 4 is a plot of the difference between adjacent elements in the "cases" array for speech
Figure 5:
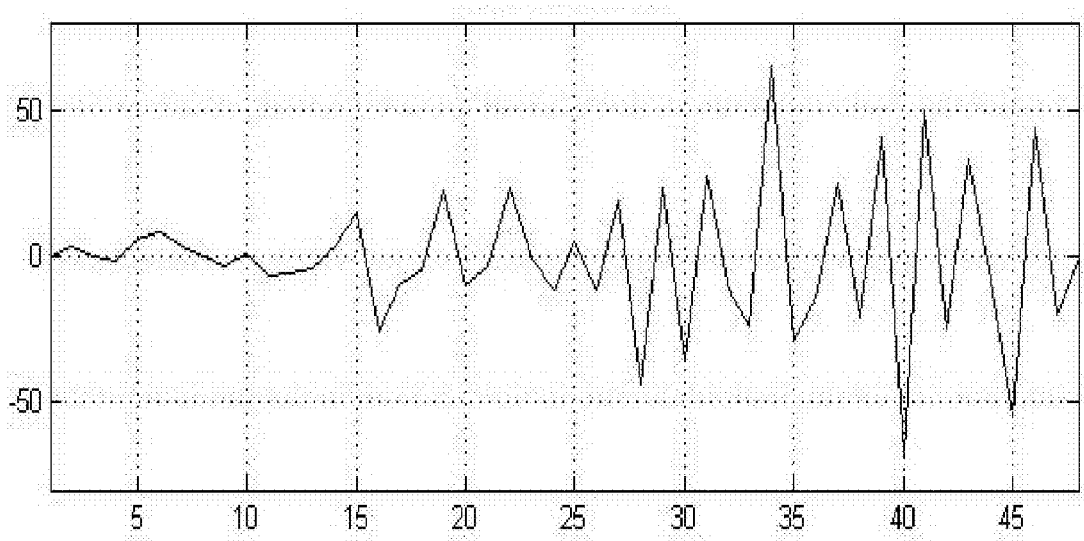
FIG. 5 is a plot of the difference between adjacent elements in the "cases" array for music

This is shown in FIG. 2 and FIG. 3 for speech and music respectively. The difference between adjacent frequencies is also noted. For speech, this signal moves close to zero as shown in FIG. 4. For music this signal fluctuates as shown in FIG. 5. A suitable peak-to-peak threshold is chosen and the number of times the difference signal crosses this threshold is calculated. This is a relevant feature that can be used for the classification process.

A bottom threshold for the signal power is chosen. To make a decision if the current decision period is speech or music, we first compare the power in dB, level with the bottom threshold. If the level is less than bottom threshold, the decision period will be classified as silence.

Figure 6:
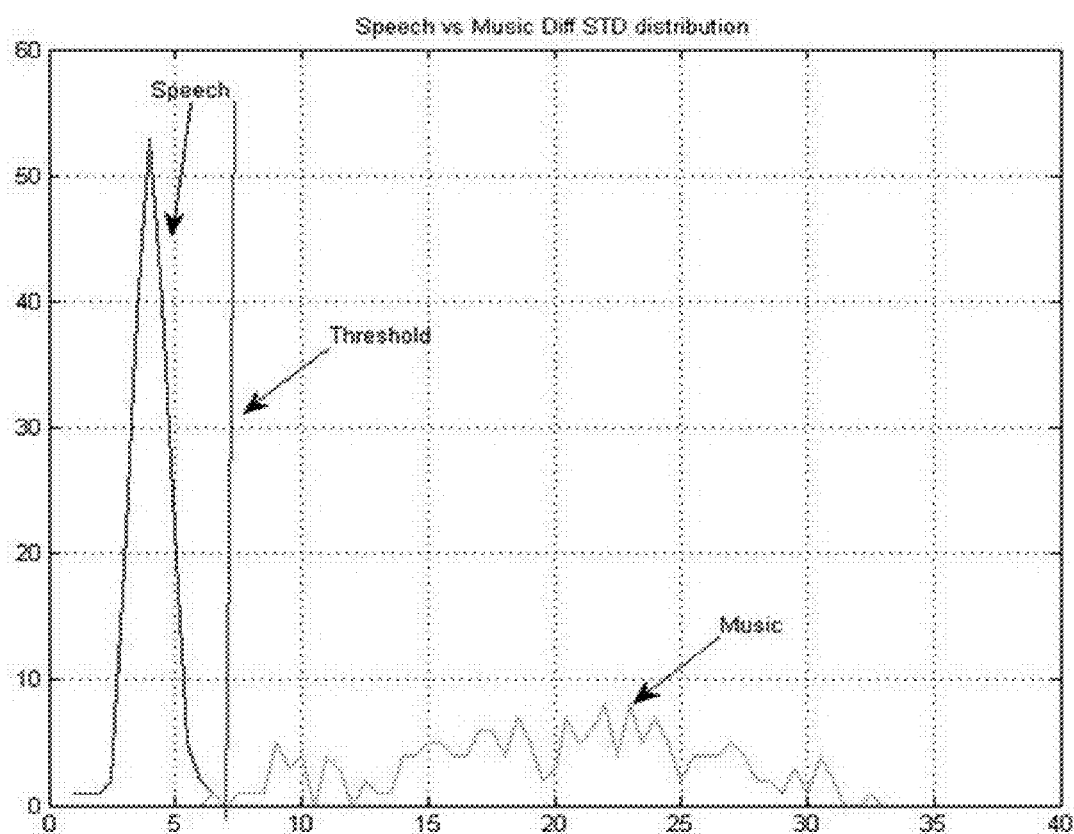
FIG. 6 is a diagram of the standard deviation distribution of the difference signal described in FIGS. 4 and 5.

For signals with power over the bottom threshold the standard deviation of the difference signal is calculated. If the standard deviation is greater than a threshold, the signal is decided to be music as shown in FIG. 6. The threshold is typically between 6 and 8 depending on what level of false detection is acceptable. Fine tuning of the decision is based on average level of silence as calculated above. If this level is below some pre set threshold for a period representing most of the analysis frames (typically 80%) a decision of Silence is made. Music has rarely long period of silence what is typically for conversational speech.

As described hereinabove, the invention has the advantages of classifying speech and music. While the invention has been described with reference to a detailed example of the preferred embodiment thereof, it is understood that variations and modifications thereof may be made without departing from the true spirit and scope of the invention. Therefore, it should be understood that the true spirit and the scope of the invention are not limited by the above embodiment, but defined by the appended claims and equivalents thereof.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

According to one embodiment of the present invention, a method for identifying speech component and music component of a sound signal is disclosed. The disclosed embodiment includes receiving a number of samples of the sound signal from one or more communication devices as disclosed above. In one exemplary form, the number of samples may be between 128 to 8192 samples. Such received samples of the sound signal are allowed to pass through a high pass filter (HPF) to obtain a corresponding output signal.

The output signals of the HPF are used to compute a power measure for each sample. The obtained power measures are averaged over a period of time to obtain a power level. Further, based on the signals being passed through the HPF, different frequency components of the signals are identified. In one exemplary form, the number of identified frequency components may be in the range of 1 to 900. Further, in one exemplary form, the frequencies of the frequency components may in the frequency ranges of 2 Hz to 40,000 Hz.

Histograms for each of the identified frequency components and histogram bins for a value higher than that of the identified different frequency components are calculated and summed-up to store the result in an array. In one exemplary form, the array may be a Cases Array of 1×M elements, where M being the number of identified frequency components.

Further steps to the method for identifying speech component and music component of the sound signal includes: finding difference between two adjacent array elements to determine corresponding difference signals, and calculating a standard deviation of the difference signals.

Furthermore, a threshold for the above obtained power level is selected. If the above calculated deviation is above the threshold, the identified frequency component is determined as music signal. Moreover, if the above calculated deviation is below the threshold, the identified frequency component is determined as speech or pause signal. In one exemplary form, the different frequency components of the signals are identified by using Goertzel algorithm.

According to one embodiment of the present invention, a method for manipulating sound signals is disclosed. The disclosed embodiments include:

1. A method of manipulating sound signals, the method comprising the steps of:
a) obtaining 'N_DEC' number of buffers, each buffer having N number of samples of sound signals;
b) passing each buffer of N samples through a high pass filter (HPF) and obtaining output signals;
c) finding power of HPF output signals for each of the N samples;
d) averaging the power over a period of time to obtain power level;
e) using the signals being passed through the HPF in Goertzel algorithm to compute a sequence s(n);
f) using the sequence s(n) to compute DFTs at different frequencies (ω);
g) storing the DFTs in an array of N_DEC×M, wherein N_DEC is number of buffers and M is number of preselected frequencies of sound signals;
h) calculating histograms for each preselected frequencies of sound signals and histogram bins for a value higher that the preselected frequencies of sound signals;
i) summing up histogram and histogram bins and storing them in Cases Array;
j) calculating the difference signal by taking the first difference between adjacent elements in the cases array;
k) calculating standard deviation of the difference signal;
l) selecting a bottom threshold for the power level;
m) determining or declaring the signal as music signal if the deviation is above the bottom threshold;
n) determining or declaring the signal as speech or pause signal if the deviation is below the bottom threshold.

2. The method of above wherein N is between 128 to 8192 samples.

3. The method of above wherein NDEC is between 5 to 950 buffers.

4. The method of above wherein K, the time index, is between the values of 1 and N.

5. The method of above wherein M, the number of pre-selected frequencies of musical notes is in the range of 1 to 900.

6. The method of above wherein the pre-selected frequencies of musical notes are in the frequency ranges of 2 Hz to 40,000 Hz.

Embodiments of the invention include but are not limited to the following items:

[Item 1] A method of manipulating sound signal, the method comprising the steps of:
a) obtaining a buffer of N samples of a sound signal;
b) passing the buffer of N samples through a high pass filter (HPF), with the HPF having a predetermined cut-off frequency in the range of 20 Hz to 800 Hz;
c) finding the power of the buffer of N samples using the equation:

$$pwr = \frac{1}{N}\sum_{k=0}^{N} x(k) * x(k)$$

where N is the number of samples in the buffer and k is the time index;
d) averaging the power over a period of time where power is expressed as dB or as level and is calculated as $$level = 10\log_{10} \sum_{i=0}^{N_{DEC}} pwr(i)$$

e) the signal passed through the HPF is processed by a voice activity detection device (VAD) to determine if the result from part d is speech or a pause, in the event the input from part d is a pause, pwr_sil is calculated, power is then averaged over a period of time, and expressed in dB is:

level_sil=10 log$_{10}$pwr_sil the power value (dB) is then exponentially averaged using the equation:

level$_{sil_{avg}}$=α*level$_{sil_{avg}}$+(1−α)*level_sil, wherein α is a value between 0.01 and 0.99
f) the signal passed through the HPF is used as an input sequence x(n) in a Goertzel calculation s(n)=x(n)+2 cos(2πω)s(n−1)−s(n−2)

to compute a sequence, s(n), the resulting sequence, s(n) may used to compute the DFTs at different ω frequencies;
g) the DFTs are altered to equal their absolute value and then stored in an array N_DEC×M wherein N_DEC equals the number of buffers considered per decision and M equals the number of pre-selected frequencies of musical notes;
f) histograms depicting energy distribution for each pre-selected frequency of musical notes are calculated and histograms bins with a higher value as compared to a pre-selected threshold are then summed and stored in a 1×M element array, sometimes called the Cases array;
g) a difference signal is calculated by taking the first difference between adjacent elements in the array depicted in f);
h) calculating the standard deviation of the difference signal;
i) selecting a bottom threshold for the power level;

j) if the standard deviation of the difference signal is greater than the selected threshold (between 6 and 8), the signal is deemed to be a music signal, otherwise the signal is deemed to be speech or a pause.

[Item 2] The method of item 1 wherein N is between 512 to 1024 samples.

[Item 3] The method of item 2 wherein NDEC is between 50 to 100 buffers.

[Item 4] The method of item 3 wherein K, the time index, is between the values of 1 and N, wherein N is in the range of 512 to 1024.

[Item 5] The method of item 4 wherein M, the number of pre-selected frequencies of musical notes is in the range of 12 to 120.

[Item 6] The method of item 5 wherein the pre-selected frequencies of musical notes are in the frequency ranges of 20 Hz to 20,000 Hz.

[Item 7] A method of manipulating sound signal, the method comprising the steps of:

a) obtaining a buffer of N samples of a sound signal;
b) passing the buffer of N samples through a high pass filter (HPF), with the HPF having a predetermined cut-off frequency in the range of 20 Hz to 800 Hz;
c) finding the power of the buffer of N samples using the equation:

$$pwr = \frac{1}{N}\sum_{k=0}^{N} x(k)*x(k)$$

where N is the number of samples in the buffer and k is the time index;
d) averaging the power over a period of time where power is expressed as dB or as level and is calculated as $$level = 10\log_{10} \sum_{i=0}^{N_{DEC}} pwr(i)$$

Where N DEC is the number of buffers considered per decision;

The signal passed through the HPF is processed by a voice activity detection device (VAD) to determine if the result from part d is speech or a pause, in the event the input is a pause, power calculated is expressed as pwr_sil, where the power is then is averaged over a period of time, and expressed in dB is:

level_sil=10 log$_{10}$pwr_sil which is mathematically equal to level_sil=10 log$_{10}$pwr_sil the power value (dB) is then exponentially averaged using the equation:

level$_{sil_{avg}}$=α*level$_{sil_{avg}}$+(1−α)*level_sil, wherein α is a value between 0.01 and 0.99 e) the signal passed through the HPF is used as an input sequence x(n) in a Goertzel calculation s(n)=x(n)+2 cos(2πω) s(n−1)−s(n−2) to compute a sequence, s(n), the resulting sequence, s(n) is used to compute the DFTs at different ω frequencies;
f) the DFTs are altered to equal their absolute value and then stored in an array N_DEC×M wherein M equals the number of pre-selected frequencies of musical notes;
g) histograms depicting energy distribution for each pre-selected frequency of musical notes are calculated and histograms bins with a higher value as compared to a pre-selected threshold are then summed and stored in a 1×M element array;
h) a difference signal is calculated by taking the first difference between adjacent elements in the array depicted in step (g);
i) calculating the standard deviation of the difference signal;
j) selecting a bottom threshold for the power level;
k) if the standard deviation of the difference signal is greater than the selected threshold (between 6 and 8), the signal is deemed to be a music signal, otherwise the signal is deemed to be speech or a pause wherein fine tuning of the decision is based on average level of silence level$_{sil_{avg}}$ calculated in step (d) and if this level is below a present threshold for a period representing 80% of the analysis frames a decision of silence is made.

Item 8. The method above wherein N DEC is between 50 to 100 buffers.

In one embodiment herein, a method for classifying one or more components of an audio signal received from a communication device is disclosed. A database is maintained for storing one or more predefined factors. The database may be updated after a specified period. Each predefined factor pertains to at least one of: a typical music component and a typical speech component of a typical audio signal. Various samples of audio signals may be selected for which classification of the audio signal component is required. Thereafter, a Goertzel calculation may be used to identify different frequency components of the selected sample. Further, the frequency components of the selected sample may be analyzed based on the one or more predefined factors;

The analysis of the frequency component of the selected sample gives resulting values that helps to determine whether the identified component is a music component or a speech component. The frequency component of the selected sample is classified as a music component if the resulting value is an equivalent of the typical music component. The frequency component of the selected sample is classified as a speech component if the resulting value is an equivalent of the typical speech component.

According to the present invention, the predefined factors may include but does not limit to frequency measurements, frequency patterns, differences of adjacent frequency measurements, predefined frequency thresholds, deviation of frequencies, and other frequencies components of the typical audio signal.

In one embodiment of the present invention, a power measure of the selected sample is computed by inputting the selected sample into a high pass filter (HPF) and processing corresponding output signals of the HPF. Thereafter, average value of the power measure is calculated over a period of time to obtain a power level. A bottom threshold for the power level is defined and standard deviation of the selected sample is computed using the Geortzel calculations.

According to the present invention, any value of the deviation that is above the bottom threshold is defined as an equivalent of the typical music component. Also, any value of the deviation that is below the bottom threshold is defined as an equivalent of the typical speech component.

As explained above, the analysis of the frequency component of the selected sample gives resulting values that helps to determine whether the identified component is a music component or a speech component. Thus, the resulting value is the value of the standard deviation that is above or below the bottom threshold depending upon the type of frequency component, i.e. music component or the speech component.

In one embodiment of the present invention, the number of samples of the audio signal is between 128 to 8192 samples. The number of identified frequency components is in the range of 1 to 900. Further, the frequencies of the frequency components are in the frequency ranges of 2 Hz to 40,000 Hz.

What is claimed is:

1. A method for classifying one or more components of a digital audio signal received from a communication device, the method comprising the steps of:
    selecting a sample of the digital audio signal being received from the communication device;
    inputting the selected sample into a high pass filter (HPF) and processing corresponding output signals of the HPF;
    computing a power measure for each sample by using output signals of the HPF;
    averaging the power measure over a period of time to obtain a power level;
    identifying different frequency components of the selected sample, computing discrete Fourier transform (DFT) values at these identified frequency components, taking the absolute value of the DFT values, and storing the DFT values in a first array;
    calculating histograms for each of the identified frequency components and histogram bins with a value higher than a specified threshold;
    summing up the histogram bins with the value higher than the specified threshold and storing the results in a second array;
    finding a difference between two adjacent array elements to determine corresponding difference signals from the second array;
    calculating a standard deviation of the difference signals;
    defining a bottom threshold for the power level;
    wherein any value of the deviation that is above the bottom threshold is defined as the equivalent of a music component and wherein any value of the deviation that is below the bottom threshold is defined as the equivalent of a speech component.

2. The method of claim 1, wherein the number of samples of the audio signal is between 128 to 8192 samples.

3. The method of claim 1, wherein the number of identified frequency components is in the range of 1 to 900.

4. The method of claim 1, wherein frequencies of the frequency components are in the frequency ranges of 2 Hz to 40,000 Hz.

* * * * *